Figure 1:
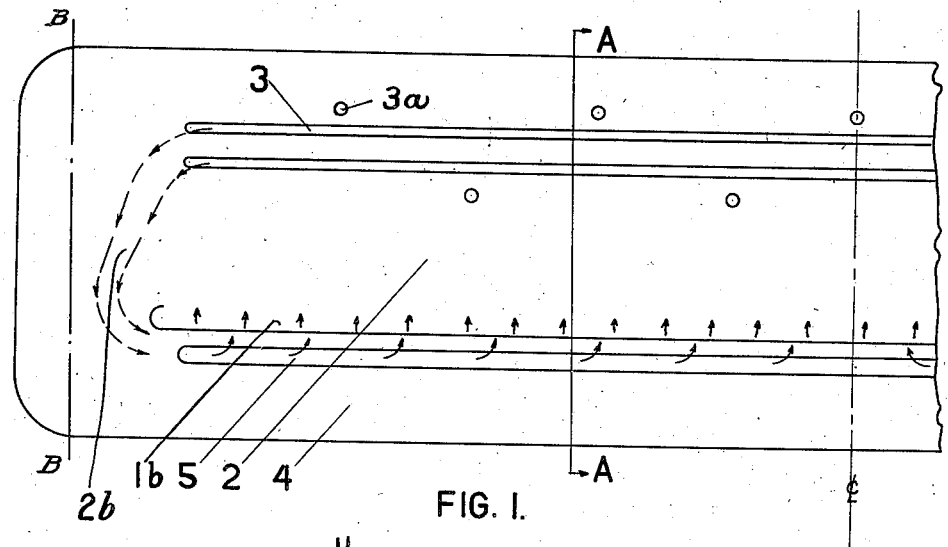

May 26, 1936.　　　　E. A. STALKER　　　　2,041,786
BOUNDARY LAYER CONTROL FOR WINGS
Original Filed March 10, 1932

INVENTOR
Edward A. Stalker

Patented May 26, 1936

2,041,786

UNITED STATES PATENT OFFICE 2,041,786

BOUNDARY LAYER CONTROL FOR WINGS

Edward A. Stalker, Ann Arbor, Mich.

Application March 10, 1932, Serial No. 597,993
Renewed October 12, 1935

7 Claims. (Cl. 244—12)

My invention relates to improvements in means to prevent the separation of the flow from bodies wetted by the flow by energizing the boundary layer. In particular it relates to wings and other aerodynamic bodies where high lift and low resistance are desired. Such bodies belong to a more general class which constricts the flow at localities situated between the ends of the body. It is not necessary that the flow be external. It may be internal as well, as for instance in a Venturi tube. In fact a common analogy used to explain the lift of a wing, is to compare the wing to one side of a very large Venturi tube. In either a wing or Venturi tube, or any body, it is important to prevent the flow from separating from the body in order to keep down the resistance to the relative motion of body and fluid; or, to permit a shortening of the body for a given width. The phenomena of separation in all cases is a boundary layer one and occurs whenever the surface turns away from the flow either too rapidly, or for too great a distance. That is, the surface has too great a curvature, or too extensive a curvature tending to leave the flow.

The boundary layer is the layer of air on a body in which the velocity has been appreciably reduced by the friction with the surface. The loss of velocity is a loss of kinetic energy.

When an attempt is made to turn a fluid through a large angle as by a wing, it is found that the fluid does not follow the surface after a certain angle to the flow is attained. If, however, energy is added to the boundary layer, this layer tends to disappear and the fluid will follow the surface.

Outside the boundary layer the velocity of the flow is high and its energy might be used to energize the boundary layer. In the case of the wing it is desirable to energize the boundary layer on the upper surface of the wing. This may be done by drawing the layer into the wing through openings in the surface or by blowing tangentially to the wing surface rearward. The same procedure could also be used in any body similar in curvature to a wing for then the pressure distribution is high at the portion near the front or at the cross section of maximum constriction—that is, higher than on the rearward extent of the surface. If openings are placed in the surface and connected to other openings forward of the first, the high suction draws in the boundary layer at the rear and discharges it at the front openings. Due to this process there is, however, no gain because the resistance of the passage connecting the two sets of openings merely detracts more kinetic energy from the boundary layer. If, however, the boundary layer drawn in the rear openings were replaced in the main stream above the boundary layer forming on the body there would result a great gain in the magnitude of the angle through which the flow could be turned. It is only necessary to interpose an active layer or stream with an appreciable velocity between the discharged boundary layer and the wing surface. One object of my invention is then to provide a high velocity jet of fluid to accelerate the boundary layer over a portion of the body and on the aft portion to draw the boundary layer into the body at the expense of the suction pressure on the forward part of the body. The boundary layer is discharged so that the high velocity jet is interposed between it and the wing. In the case of wings particularly, I provide the high velocity jet by a passage through the wing which utilizes the impact pressure of the main stream and the suction above the body to generate a high velocity jet. It is also possible to use a prime mover to create the high velocity jet more directly as by a pump.

Figure 2:
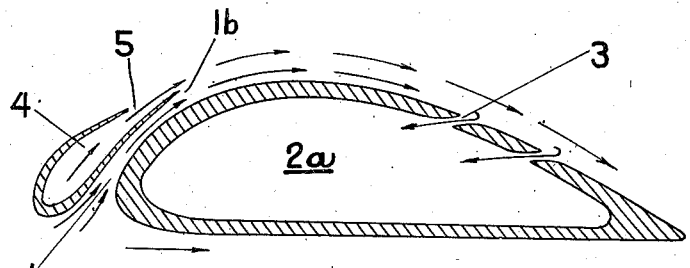
Figure 3:
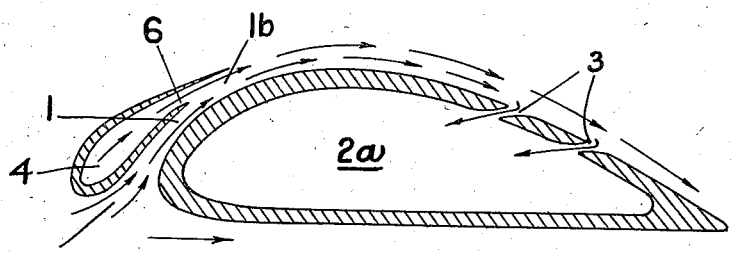
Figure 1A:
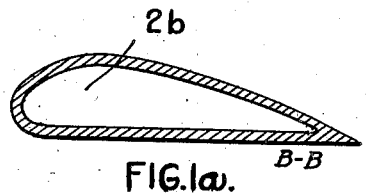

Figure 1 is a plan view of a portion of the wing. Figure 1a is a vertical section along the line BB in Figure 1. Figure 2 is a vertical section through the wing. Figure 3 is a possible variation of the vertical section.

Similar numerals refer to similar parts throughout the several views.

In Figures 1 and 2, a slot 1 extends through the wing 2 and serves to transform the pressure below the wing into a jet of high kinetic energy. This jet accelerates the boundary layer. There are also openings 3 in the surface of the wing through which air is drawn into the wing. The inward flow is caused by the low pressure existing above the forward wing portion 4. That is, the opening 5 in the part 4 communicates, as indicated by the dotted arrows in Figure 1, with the openings 3. The communication passage might be anywhere along the span but is preferably located near the tips where boundary layer control is less important. By the above arrangement there is a layer of high kinetic energy imposed between the wing and the layer from which energy is taken by the flow through 5. That is, the flow from 5 lies on the upper side of the flow through the slot 1, and thus the inflow at 3 is not at the expense of the kinetic energy in the boundary layer.

In detail the construction of the wings consists of walls forming within two compartments 4 and 2a closed except for the boundary layer openings and the end passages providing communication between the compartments 4 and 2a. The compartment 4 is formed on the forward side by the outer wall of the wing and on the rearward side by the wall of the passage 1. The compartment 2a is formed on its forward side by the wall of the passage 1 and on its other sides by the wing walls. The rear compartment 2a has induction openings 3 and 3a for the boundary layer. The openings 3 consist of slots extending spanwise in the upper surface of the wing. Holes 3a may also be added. The compartment 4 has a slot exit 5 to the region above the wing as indicated in Figure 2. At the ends of the compartments 4 and 2a there is a communication passage 2b formed by the hollow interior of the wing. It is shown in Figure 1a which is a vertical section chordwise of the wing of Figure 1. It is not necessary that the exit 5 be on the upper surface of the wing. As an alternative arrangement the opening may be that indicated by 6 in Figure 3 where the exit is into the slot 1. As for 5 in Figure 2 the exit 6 may be a slot extending spanwise of the wing.

By preventing the separation of the flow from the surface of bodies their resistance is greatly reduced. In the case of wings the resistance is reduced and the maximum lifting capacity is increased.

While I have illustrated a preferred form of my invention it is to be understood that I do not limit myself to these specific forms but intend to claim my invention broadly as defined by the scope of the appended claims.

What I claim is:

1. In a body associated with a relative flow of fluid, a body surface possessing in virtually the same side an induction opening for the intake of the boundary layer and a discharge opening for the emission of the inducted air, a conduit to provide a communication passage from the induction opening to the discharge opening, and means defining a fluid conveying passage unobstructed across a major portion of its cross sectional area by the impeller of a turbine to interpose a stream of fluid between the body surface and the fluid discharged from the discharge opening so that said stream is possessed of an energy content per unit of mass at least as high as that of the relative flow.

2. In a body associated with a main relative flow of fluid, a body surface possessing an induction opening in its surface for the intake of the boundary layer into the body interior and a discharge opening for the emission of the inducted air, a third opening to the rear of the discharge opening, a conduit to provide communication between the induction and discharge openings, and means defining a fluid conveying passage unobstructed across a major portion of its cross sectional area by the impeller of a turbine to supply fluid to the said third opening with a substantially as full complement of energy per unit of mass as possessed by the main flow.

3. In a wing, associated with a relative flow of fluid; a means to interpose, between a wing and its boundary layer, a stream of fluid of energy content substantially as large as that of the relative flow, comprising a wing body possessing in its upper surface a spanwise slot extending at least along a major portion of the semi-span, a divided upper surface to the rear of the said slot to form a second slot and an induction opening leading into the wing, a conduit to connect the induction opening and the forward slot, and a fluid conveying conduit to provide a rearward flow through the exit of the second slot.

4. In a wing associated with a main relative flow, a wing body whose upper surface possesses an opening in the front portion, other openings in the rear portion and the central portion, a conduit connecting the front and the rear openings, and means defining a fluid conveying passage unobstructed across a major portion of its cross sectional area by the impeller of a turbine to deliver a fluid stream from the central opening with an energy complement substantially as high as the energy content of the main stream, so that an energetic layer of fluid is interposed between the wing surface and the discharge from the opening in the front portion.

5. In a wing associated with a relative flow of fluid, a wing body constructed with a front portion and a rear portion to form therebetween a comparatively narrow through slot to convey a fluid flow of high energy content from the under surface to the upper surface of the wing, said slot extending along the span, said body having a perforated surface of the front portion to form a discharge opening ahead of the said through slot and a perforated surface of the rear portion to form an opening for the induction of the boundary layer, both of said openings being in communication with the wing interior, and walls defining a passage communicating between the said induction and discharge openings so that the boundary layer of the rear portion is inducted by the greater suction pressure on the said front portion, said flow in said through slot then serving to interpose a stratum of fluid of large energy content between the wing body surface and the discharge opening to preserve streamline flow along the surface.

6. In a wing associated with a relative flow of fluid, a wing body constructed with a front portion and a rear portion to form therebetween a comparatively narrow through slot to convey a fluid flow of high energy content from the under surface to the upper surface of the wing, said slot extending along a major portion of the semi-span, said body having a perforated surface of the front portion to form a discharge opening ahead of the said through slot and a perforated surface of the rear portion to form an opening for the induction of the boundary layer, both of said openings being in communication with the wing interior, and walls defining a passage communicating between the said induction and discharge openings so that the boundary layer of the rear portion is inducted by the greater suction pressure on the said front portion, said flow in said through slot then serving to interpose a stratum of fluid of large energy content between the wing body surface and the discharge opening to preserve streamline flow along the surface.

7. In a wing associated with a relative flow of air, a wing body constructed with a front portion and a rear portion to form a comparatively narrow through slot to convey an air flow of high energy content from the under surface to the upper surface of the wing, said slot extending along the span, said body having a perforated upper surface to form an opening whereby the boundary layer can be inducted into the wing, and walls defining a passage to convey the boundary layer air and discharge it above the flow from the said through slot, said flow from the said through slot then serving to place next to the wing a layer of air of high energy content which will preserve the high lifting capacity of the wing from adverse effects of the said discharged air.

EDWARD A. STALKER.